United States Patent [19]

Bol

[11] Patent Number: 5,454,205
[45] Date of Patent: Oct. 3, 1995

[54] LEAKPROOF FILLING STATION FLOOR

[76] Inventor: Johannes B. Bol, Jupiterweg 1, 8251 AW Dronten, Netherlands

[21] Appl. No.: 104,381

[22] Filed: Jul. 21, 1993

[30] Foreign Application Priority Data

Jul. 24, 1992 [NL] Netherlands ............... 9201332

[51] Int. Cl.$^6$ ...................................... E04B 1/00
[52] U.S. Cl. .............. 52/745.05; 52/294; 52/220.5; 405/53; 405/303
[58] Field of Search ................ 52/220.1, 292, 52/294, 296, 27, 220.5; 405/53, 303

[56] References Cited

U.S. PATENT DOCUMENTS

| | | |
|---|---|---|
| 3,190,041 | 6/1965 | Kimball .................. 52/294 X |
| 3,194,853 | 7/1965 | Weise et al. ............ 52/294 X |
| 3,777,774 | 12/1973 | Martin . |
| 4,569,173 | 2/1986 | Hultquist ................ 52/294 X |
| 4,615,280 | 10/1986 | Shoop et al. . |
| 4,842,163 | 6/1989 | Bravo . |
| 4,978,249 | 12/1990 | Killman . |
| 5,027,849 | 7/1991 | Diesener . |
| 5,332,335 | 7/1994 | Daul . |

Primary Examiner—Lanna Mai
Attorney, Agent, or Firm—Edmund M. Jaskiewicz

[57] ABSTRACT

Method for constructing a filling station, having a number of storage tanks, one or more pump islands with a number of pumps on each pump island, and also lines, such as the lines for the supply of the necessary oil and petrol from the storage tanks to the pumps, and for the discharge of rainwater and/or spilt product, and a floor surrounding the pump island. First of all a ground slab is made in one piece by monolithic construction, at the same time a number of facilities being provided in the slab, such as fixing means at the position of the so-called islands where the pumps are placed. In the ground slab near the top side a recess or trench and in the trench lines are then placed, and the structures such as pump islands, pumps and possibly a canopy are fixed to said slab.

5 Claims, 2 Drawing Sheets

LEAKPROOF FILLING STATION FLOOR

The invention relates to a method for constructing a filling station, comprising a number of storage tanks, one or more pump islands with a number of pumps on each pump island, and also lines, such as the lines for electricity, for the supply of the necessary oil and petrol from the storage tanks to the pumps, and for the discharge of rainwater and/or spilt product, and a floor surrounding the pump island up to a desired distance from a pump island, and a ground slab for a filling station.

Usually in the construction of filling stations, at the place where the pumps are situated, the so-called pump island, the ground has to be paved or tiled up to at least five meters from the island on which the fuel pumps are situated, and the joints between paving stones or tiles then have to be made leakproof with filling compound, so that polluting liquids such as petrol and oil cannot reach the ground below the paving through these joints.

The construction of a filling station has been carried out until now by first installing the storage tanks in the ground, then constructing the pump island, for which purpose a concrete foundation, containing a number of vertical passages for the throughfeed of the lines, is poured. These vertical passages or holes must be filled up after the various lines are installed, otherwise the ground under the foundation runs a great risk of becoming polluted. Before the surrounding paving is laid, the various lines are laid in the ground, following which the paving is carried out, and the joints in the paving are made leakproof.

There are many disadvantages in such a paving. For example, the lines running to the pump island must be taken vertically upwards through the foundation at the pump island.

This gives rise to a hole there which must be sealed. These vertical breaks in the foundation are in the island, and it is precisely there that the spillage of liquids will occur most, due to leakage in the pumps, which is normally not visible. Another disadvantage is that ground settlement will cause the paving to subside, partly as the result of the cars and lorries passing over it. The subsidence depressions will generally not be uniform. Where there are larger quantities of rainwater to be discharged, puddles will consequently occur in the depressions. It is also possible for rainwater to be discharged together with pollutants in an undesirable way towards an edge of the paving, over which it washes, so that the ground at that point is polluted. If there is further ground subsidence, the leak-free filling of the paving will crack, with the result that liquids still have the chance to reach the ground below through the floor, and to pollute it there. In order to prevent this as far as possible, the paving will most certainly have to be renewed every two to three years if the ground below is soft. Besides, the lines run under the paving. The great disadvantage of this is that if the ground settles unevenly, shear stress can occur on the horizontally running lines. Too high shear stress can damage these lines, with the result that slight leakages can occur unnoticed, and can greatly pollute the ground below the paving. It is also often very difficult to make a floor leakproof afterwards, for example if a part has to be broken up because one or more lines have to be replaced.

The object of the invention is to overcome these drawbacks. This object is achieved by a method according to the invention through the fact that first of all a ground slab is made in one piece by monolithic construction, preferably from reinforced concrete, at the same time a number of facilities being provided in the slab, such as fixing means at the position of the so-called islands where the pumps are placed, and in the ground slab near the top side a recess or trench which in the horizontal direction of each island runs towards the edge of the slab, and in that after the ground slab has been produced, lines are then provided on said slab in the trench, for example for petrol, oil, air, electricity etc., and the structures such as pump islands, pumps and possibly a canopy are fixed to said slab.

This method has the great advantage that the floor surrounding the pump islands is not broken anywhere by leakage points in the vertical direction to the ground below. Nor can leakage points occur due to uneven ground subsidence. Due to the fact that the lines are integrated near the top side in the floor in an easily accessible way, it is always possible to check the lines for leakage and to replace or repair them if necessary, without having to break up the expensive liquid-tight paving.

Finally, the invention makes modular construction of elements such as canopies and petrol pumps possible. These elements can then easily be replaced if there is a change in company logo. A separate foundation for these elements is not necessary, so that these costs are saved.

The invention will be explained in greater detail with reference to the drawing, in which.

Figure 1:
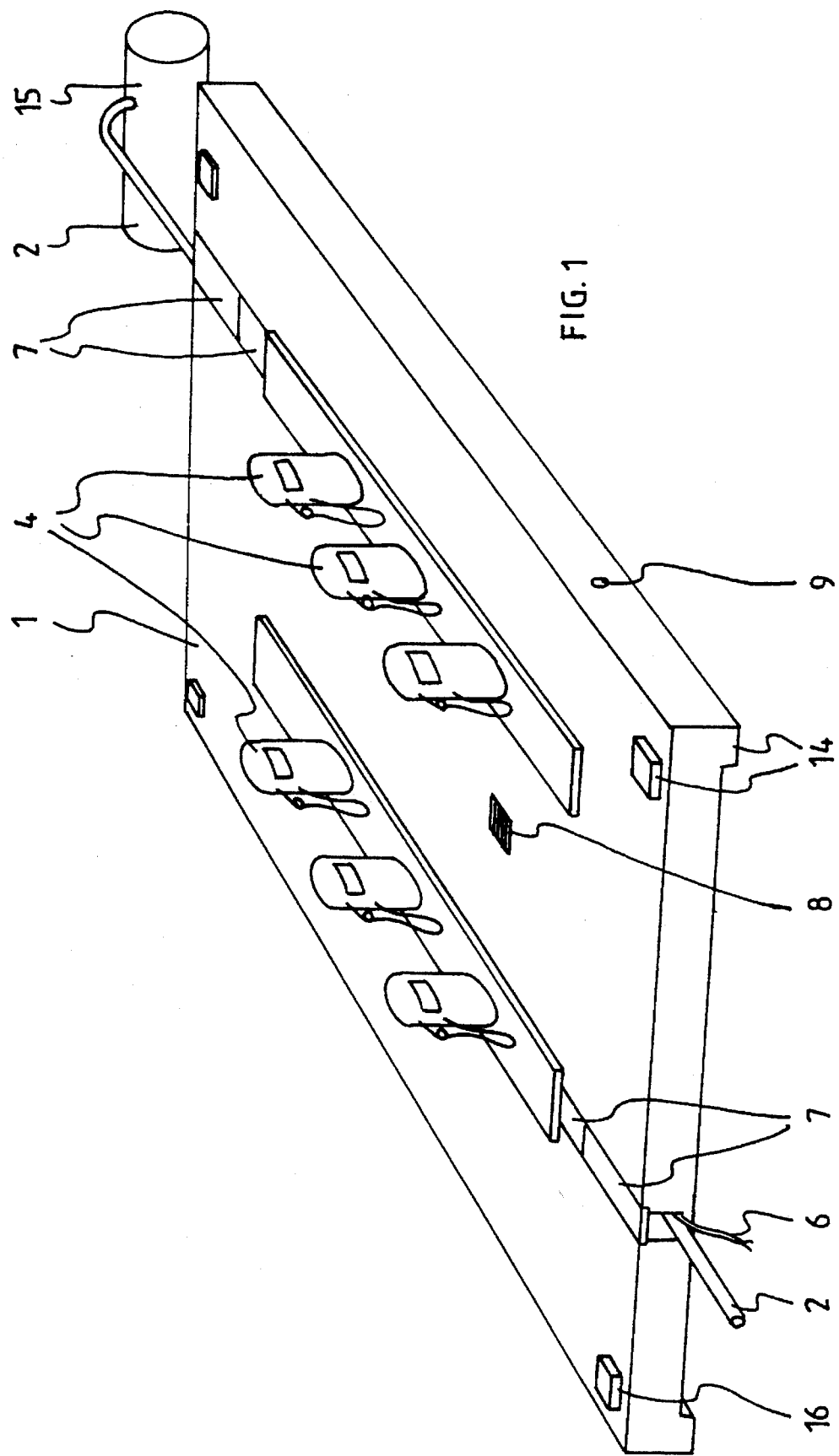
FIG. 1 shows a possible embodiment of a floor of a filling station, in perspective.

FIG. 1 shows a perspective general view of a possible embodiment of a ground slab 1, produced by the method proposed according to the invention. The ground slab 1 consists of one undivided and unbroken part having reinforcing ribs 14 near the edges thereof. Lines 2 come up from underground storage tanks 15 for the various fuels, outside the range of the ground slab 1, which lines then deflect horizontally and are conveyed through recesses 3 in the face of the ground slab 1 to the fuel pumps 4 on the pump islands 5. Other supply lines 6, such as those for oil, air, water and electricity, are also disposed in these recesses 3. The recesses 3 are covered by heavy covering means 7 which can be driven over, and which are designed in such a way that heavy traffic can drive over them without these covering means giving way. Gulleys 8 are provided for the discharge of rainwater and spilt products. From these gulleys water is discharged through pipes 9 integrated in the ground slab to, for example, a mud trap/oil separator (not shown). These pipes 9 slope downwards slightly in the direction of the edge. A structure which may comprise sockets 16 on the top surface of slab 1 are provided for mounting a canopy thereon.

Figure 2:
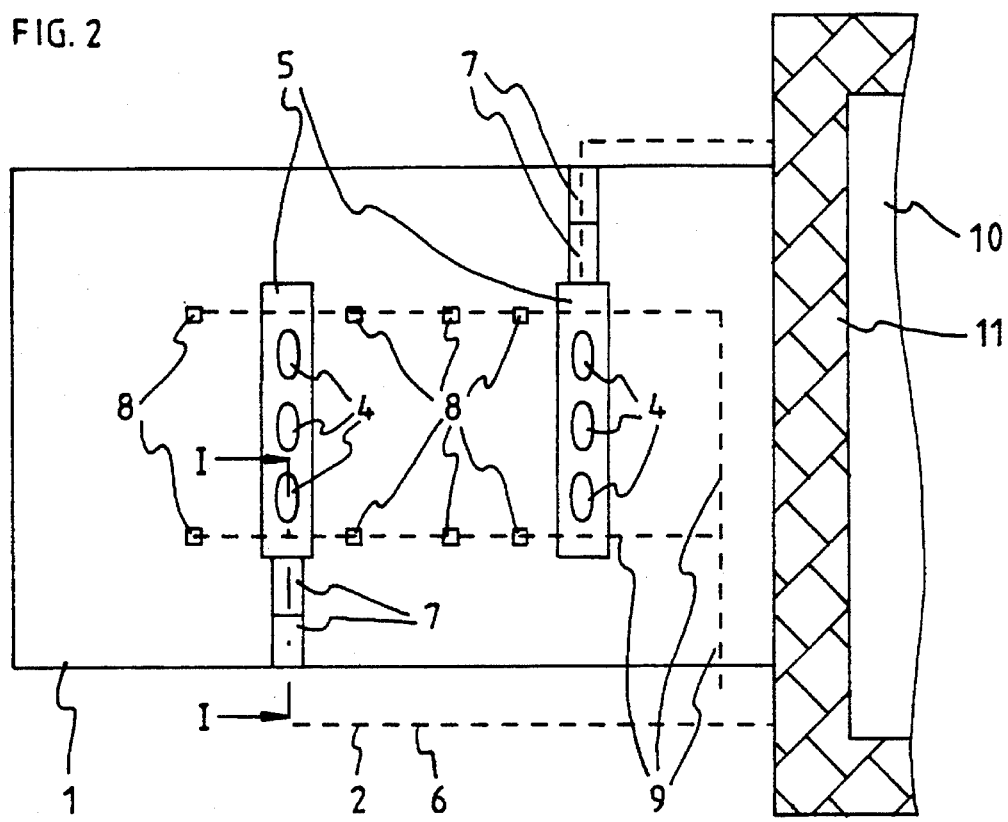
FIG. 2 shows a top view of the filling station shown in FIG. 1.

FIG. 2 shows the same ground slab, in top view here. The rainwater discharge pipes are fed by gulleys 8 placed in series. Supply lines 2 and 6 are shown as dashed lines. The service building 10 and the surrounding pavement 11 are also shown diagrammatically.

Figure 3:
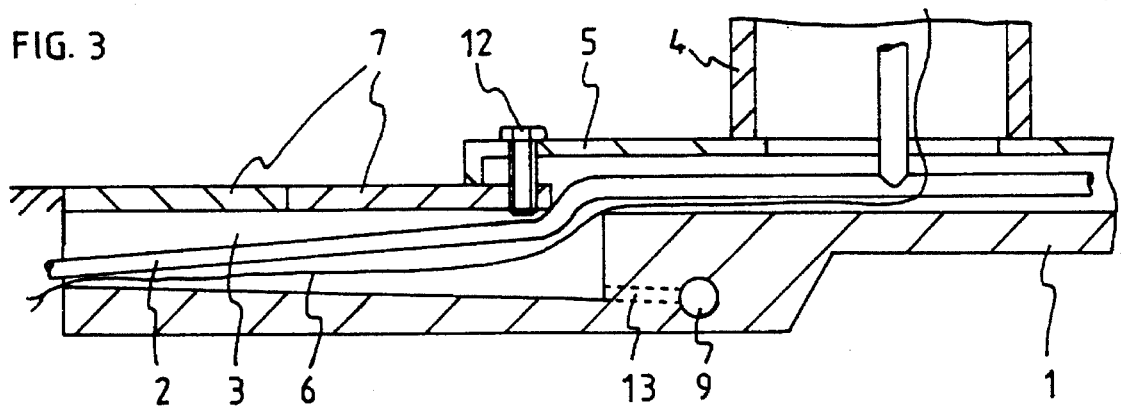
FIG. 3 shows a cross-section of a detail of the floor shown in FIG. 1.

FIG. 3 shows a section along the line I—I in FIG. 2. It shows fixing means 12 which are poured, for example as inserts, together with the ground slab material, and by means of which the structure, here the pump island, can be installed in a modular way. The bottom of the recesses 3 runs at a slight angle to the horizontal bottom slab 1. These recesses are connected by means of discharge pipes 13 to the rain discharge pipes 9, so that liquids which have accumulated in the recesses 3 are also discharged to the mud trap/oil separator (not shown).

I claim:

1. Method for constructing a filling station having a number of storage tanks, one or more pump islands with a number of pumps on each pump island, lines for electricity, supply lines for oil and petrol from storage tanks to the pumps, and lines for the discharge of rain water and/or spilt products, and a floor surrounding the pump island up to a predetermined distance from a pump island, the steps of forming a ground slab of reinforced concrete in one integral piece by monolithic construction, providing a number of facilities on the slab comprising fixing means at the position of the islands where pumps are to be placed, forming in the ground slab at the top side thereof a recess or trench which in the horizontal direction of each island runs toward the edge of the slab, and after the ground slab has been formed, disposing lines in the trench for petrol, oil, air and electricity, providing on the slab structures for fixing thereon pump islands, pumps and a canopy.

2. Method according to claim 1 in which after the formation of the ground slab structures comprising canopies, fuel pumps or service units, which are manufactured elsewhere as a construction kit, are fitted in a detachable manner by means of fixing means disposed integrally in said slab.

3. A filling station comprising a number of storage tanks, one or more pump islands with a number of pumps on each pump island, a plurality of lines for electricity, for the supply of the necessary oil and petrol from the storage tanks to the pumps, and for the discharge of rain water and/or spilt products, a floor surrounding the pump island at a predetermined distance therefrom, said floor comprising a one piece monolithic ground slab preferably of reinforced concrete, a plurality of facilities being positioned in the slab comprising fixing means at the position of the islands where the pumps are placed, said ground slab having near the top side a recess or trench which in the horizontal direction of each island runs toward an edge of the slab, said lines being disposed on said slab in said trench, structures comprising one or more pump islands, pumps and a canopy being fixed to said slab, said ground slab sloping slightly conically toward at least one large or small gulley, and a discharge pipe from the gulley to an edge in the concrete being provided in the concrete slab during the manufacture thereof.

4. A filling station according to claim 3 wherein the bottom of the trench for the lines slopes gently from the edge of the slab to the island.

5. A filling station according to claim 4 wherein a reinforcing rib is disposed near an edge of the ground slab.

* * * * *